(12) United States Patent
Arcari et al.

(10) Patent No.: US 12,181,333 B2
(45) Date of Patent: Dec. 31, 2024

(54) SYSTEMS AND METHODS FOR ACCURATE MEASUREMENT OF ITEMS IN A DISTRIBUTION NETWORK

(71) Applicant: United States Postal Service, Washington, DC (US)

(72) Inventors: Lisa Helene Arcari, Washington, DC (US); William Douglas Hallahan, Fredericksburg, VA (US)

(73) Assignee: United States Postal Service, Washington, DC (US)

( * ) Notice: Subject to any disclaimer, the term of this patent is extended or adjusted under 35 U.S.C. 154(b) by 791 days.

(21) Appl. No.: 16/403,302

(22) Filed: May 3, 2019

(65) Prior Publication Data

US 2019/0339116 A1 Nov. 7, 2019

Related U.S. Application Data

(60) Provisional application No. 62/666,951, filed on May 4, 2018.

(51) Int. Cl.
*G01G 23/01* (2006.01)
*G06Q 10/083* (2023.01)
*G06Q 30/018* (2023.01)

(52) U.S. Cl.
CPC .......... *G01G 23/01* (2013.01); *G06Q 10/083* (2013.01); *G06Q 30/018* (2013.01)

(58) Field of Classification Search
CPC ..................................................... G01G 23/01
See application file for complete search history.

(56) References Cited

U.S. PATENT DOCUMENTS

| | | | | |
|---|---|---|---|---|
| 5,832,417 | A * | 11/1998 | Petrucelli | G01G 23/01 702/101 |
| 8,841,564 | B1 * | 9/2014 | Roberts, Sr. | G01G 19/083 177/25.13 |
| 9,523,604 | B2 * | 12/2016 | Fankhauser | G01G 23/012 |
| 2006/0074595 | A1 * | 4/2006 | Yuan | G05B 23/0254 702/182 |
| 2007/0198222 | A1 * | 8/2007 | Schuster | G01D 1/00 702/182 |
| 2008/0141755 | A1 * | 6/2008 | Edwards | G01G 23/3735 73/1.13 |
| 2009/0222399 | A1 * | 9/2009 | Gomez | G05B 23/0221 709/224 |
| 2012/0285218 | A1 * | 11/2012 | Inglin | G01G 23/01 73/1.13 |

* cited by examiner

*Primary Examiner* — Kyle R Quigley
(74) *Attorney, Agent, or Firm* — Knobbe, Martens, Olson & Bear LLP

(57) ABSTRACT

Methods and systems are provided for rating quality of a scale within a plurality of scales. A method of determining a quality rating may include weighing a package on a scale, weighing the first package on a plurality of other scales, and comparing the weight of the package on the scale with the weight of the package on the plurality of other scales. The more agreement between the weight of the package on the scale with the weight of the package on the plurality of other scales, the higher the quality rating of the scale.

17 Claims, 11 Drawing Sheets

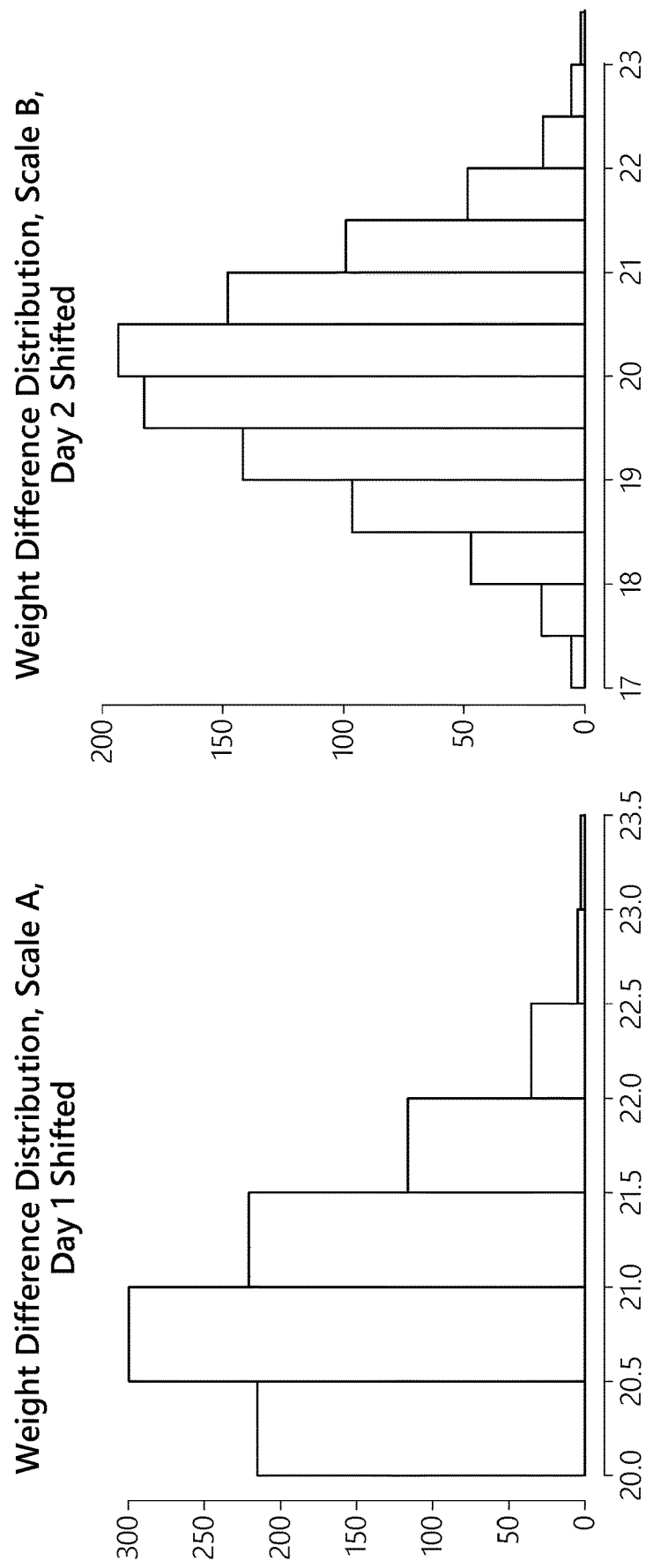

SYSTEMS AND METHODS FOR ACCURATE MEASUREMENT OF ITEMS IN A DISTRIBUTION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/666,951, filed May 4, 2018, the entire contents of which are hereby incorporated by reference.

BACKGROUND

Methods, systems, and devices for implementing item scales in distribution networks are provided. In large packaging systems, different types of scales are used to measure package weight or weights of goods for shipment. Industrial shipping scales can weigh hundreds, thousands or even millions of packages during regular course of use. Accurate weight measurements for each package can be essential both for shipping as well as controlling cost. However, more accurate weight measurements may be achieved more often only when the scales are determined to be accurate. Methods of calibration of each scale within an industrial site using test weights or taring can be time consuming and costly. Thus, there needs to be a method of determining individual scale accuracy and quality within a group of scales without constant calibration of the individual scale.

SUMMARY

In a first aspect, a method of quality rating of a first scale is provided. The method includes weighing a first package on the first scale, weighing the first package on a plurality of other scales and comparing the weight of the first package on the first scale with the weight of the first package on the plurality of other scales. The more agreement between the weight of the first package on the first scale with the weight of the first package on the plurality of other scales, the higher the quality rating of the first scale. In some embodiments, the weighing the first package on the plurality of other scales is only considered if it is performed within a set time from when the weighing of the first package on the first scale is performed.

In a second aspect, a method of rating quality of a plurality of scales is provided. The method includes weighing a first package on a plurality of scales, assigning a first pass rate to each scale within the plurality of scales based upon general agreement of first package weight between each of the scales within the plurality of scales, weighing a second package on a plurality of scales and assigning a second pass rate to each scale within the plurality of scales based upon both general agreement of second package weight between each of the scales within the plurality of scales and with each of the scales within the plurality of scales having a greater influence based upon a higher first pass rate. In some embodiments, the first package includes a plurality of first packages. In some embodiments, the greater the number of the plurality of first packages, the higher the confidence in the quality rating of the plurality of scales. In some embodiments, the weighing the first package on the plurality of scales is only considered if it is performed within a set time from when the weighing of the first package on the first scale is performed.

In another aspect, a method of measuring an item comprises weighing a first package on a first scale; weighing the first package on a plurality of other scales; storing, in a data store, a weight measurement of the first package on the first scale and a plurality of weight measurements of the first package on the plurality of other scales; comparing the weight measurement of the first package on the first scale with the weight measurements of the first package on the plurality of other scales; determining if a threshold number of the weight measurements of the first package on the plurality of other scales is within a weight tolerance of the weight measurement of the first package on the first scale; and storing, in the data store, a scale weighting factor associated with the first scale, the scale weighting factor determined based at least in part on whether the threshold number of the weight measurements of the first package on the plurality of other scales is within the weight tolerance of the weight measurement of the first package on the first scale.

In some embodiments, the method further comprises weighing a plurality of second packages on the first scale and on the plurality of other scales; storing a plurality of weight measurements for the plurality of second packages on the first scale and on the plurality of other scales; comparing the plurality of weight measurements of the plurality of second packages on the first scale with the weights of the plurality of second packages on the plurality of other scales; and determining if a threshold number of the weight measurements of the second packages on the plurality of other scales is within a weight tolerance of the weight measurements of the plurality of second packages on the first scale.

In some embodiments, the method further comprises determining a total number of weight measurements for the first scale and for the plurality of other scales; determining a percentage of weight measurements of the first package and the plurality of second packages on the first scale which are within the weight tolerances of the weight measurements for the first package and for the plurality of second packages; and determining whether the total number of weight measurements for the first scale has a minimum number of weight measurements.

In some embodiments, the method further comprises if the total number of weight measurements for the first scale is less than the minimum number of weight measurements, setting the scale weighting factor to a neutral value; and if the total number of weight measurements for the first scale is greater than the minimum number of weight measurements, setting the scale weighting factor to correspond to the percentage of weight measurements of the first package and the plurality of second packages on the first scale which are within the weight tolerances of the weight measurements for the first package and for the plurality of second packages.

In some embodiments, the method further comprises if the total number of weight measurements for each the plurality of other scales is less than the minimum number of weight measurements, setting the a scale weighting factor for each of the plurality of other scales to a neutral value; and if the total number of weight measurements for each of the plurality of other scales are greater than the minimum number of weight measurements, setting the scale weighting factor for each of the plurality of other scales to correspond to the percentage of weight measurements of the first package and the plurality of second packages on the plurality of other scales which are within the weight tolerances of the weight measurements for the first package and for the plurality of second packages.

In some embodiments, the method further comprises summing the scale weighting factor for each of the plurality of other scales which was determined to be within the weight tolerance of the weight measurement of the weight measurement for the second scale; summing the scale weighting factor for each of the plurality of other scales regardless of whether the weight measurement was within the weight tolerance to obtain a total combined scale weighting factor; dividing the summed scale weighting factor for each of the plurality of other scales which was determined to be within the weight tolerance of the weight measurement of the weight measurement for the second scale by the total combined scale weighting factor; and storing the division result of dividing the summed scale weighting factor and the total combined scale weighting factor.

In some embodiments, the method further comprises determining the weight measurement of the first item on the first scale when the division result is greater than a scale weighting factor threshold.

In some embodiments, the method further comprises categorizing the weight measurement of the first item on the first scale as a "pass" when the division result is greater than a scale weighting factor threshold.

In some embodiments, the method further comprises determining, for the first scale, the number of weight measurements which are categorized as "pass" measurements in a given time period.

In some embodiments, the method further comprises dividing the number of weight measurements categorized as a pass by the total number of weight measurements of the first item and the plurality of second items on the first scale to obtain a score for the first scale; and determining the first scale is a trusted scale when the score for the first scale is greater than a trust threshold.

In some embodiments, the trust threshold is set at 95%.

In some embodiments, the scale weighting factor threshold is set at 50%.

In some embodiments, the minimum number of weight measurements is 5.

In some embodiments, the threshold number of the weight measurements is 50%.

In some embodiments, the weight tolerance is plus/minus 0.2 ounces.

In another aspect, a method of rating quality of a plurality of scales, comprises weighing a first package on a plurality of scales; assigning a first pass rate to each scale within the plurality of scales based upon general agreement of first package weight between each of the scales within the plurality of scales; weighing a second package on a plurality of scales; and assigning a second pass rate to each scale within the plurality of scales based upon both general agreement of second package weight between each of the scales within the plurality of scales and with each of the scales within the plurality of scales having a greater influence based upon a higher first pass rate.

In another aspect, a system of quality rating of a scale or measuring an item comprises a first scale to weigh a first package; a plurality of other scales for weighing the first package; a processor configured to receive a weight measurement for the first package from the first scale and a plurality of weight measurements for the first package from the plurality of other scales; a data store configured to store the weight measurement of the first package on the first scale and the plurality of weight measurements of the first package on the plurality of other scales; wherein the processor is further configured to: compare the weight measurement of the first package on the first scale with the plurality of weight measurements of the first package on the plurality of other scales; and determine if a threshold number of the weight measurements of the first package on the plurality of other scales is within a weight tolerance of the weight measurement of the first package on the first scale.

BRIEF DESCRIPTION OF THE DRAWINGS

Features of the present disclosure will become more fully apparent from the following description and appended claims, taken in conjunction with the accompanying drawings. It will be understood that these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

FIG. 7C depicts the weight distributions for the scale of FIG. 7A shifted based on the captured weight of the scale.

FIG. 7D depicts the weight distributions for the scale of FIG. 7B shifted based on the captured weight of the scale.

DETAILED DESCRIPTION

Figure 1:
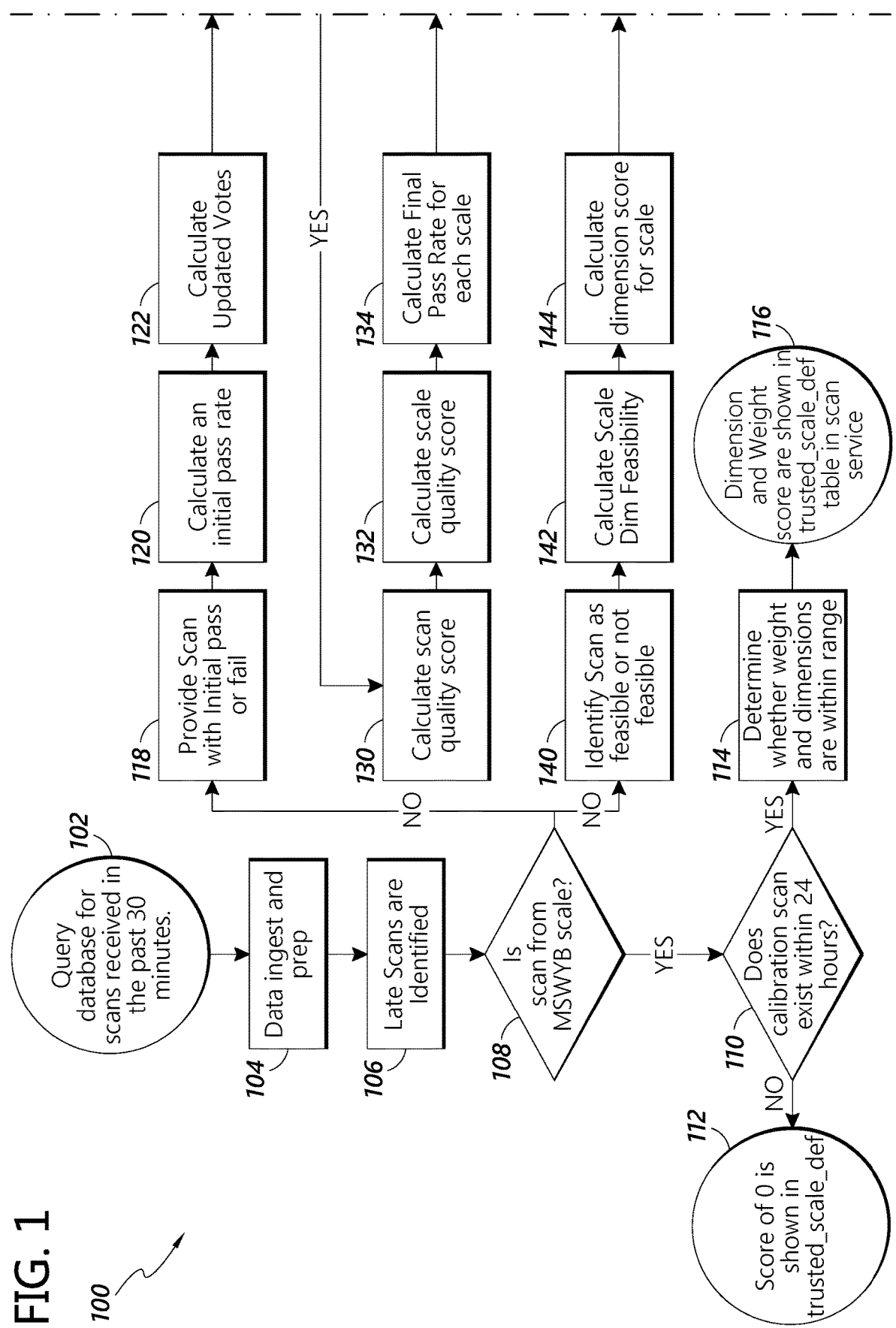
FIG. 1 is a flow diagram illustrating an exemplary method of rating scale quality of a plurality of scales.
Figure 1:
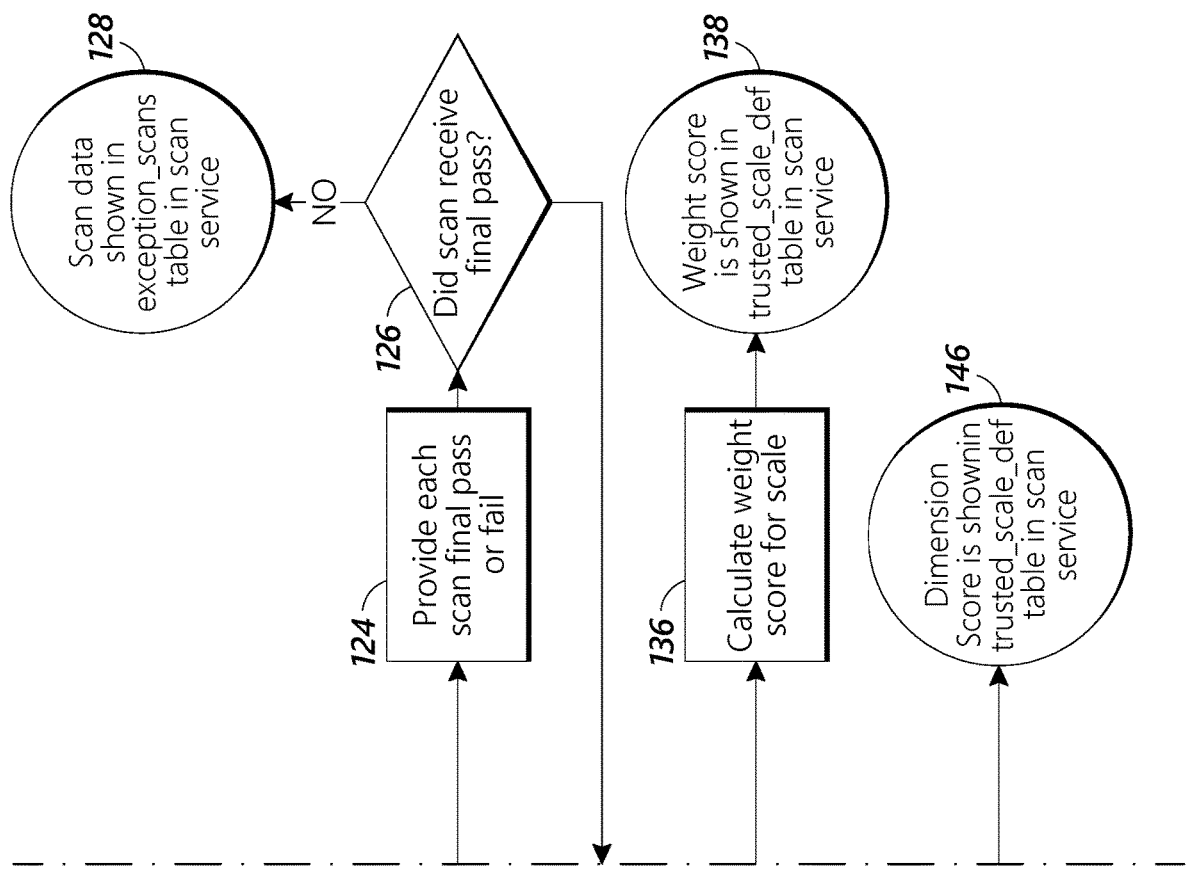

It will be readily understood that the aspects of the present disclosure, as generally described herein, can be arranged, substituted, combined, separated, and designed in a wide variety of different configurations, all of which are explicitly contemplated herein.

Unless defined otherwise, technical and scientific terms used herein have the same meaning as commonly understood by one of ordinary skill in the art to which the present disclosure belongs. All patents, applications, published applications and other publications referenced herein are expressly incorporated by reference in their entireties unless stated otherwise. For purposes of the present disclosure, the following terms are defined below.

By "about" is meant a quantity, level, value, number, frequency, percentage, dimension, size, amount, weight or length that varies by as much as 30, 25, 20, 15, 10, 9, 8, 7, 6, 5, 4, 3, 2 or 1% to a reference quantity, level, value, number, frequency, percentage, dimension, size, amount, weight or length. When a value is preceded by the term about, the component is not intended to be limited strictly to that value, but it is intended to include amounts that vary from the value.

Throughout this specification, unless the context requires otherwise, the words "comprise," "comprises," and "comprising" will be understood to imply the inclusion of a stated step or element or group of steps or elements but not the exclusion of any other step or element or group of steps or elements.

Some embodiments disclosed herein relate to methods of determining scale accuracy and assessing trust or confidence of scales within a distribution network. In the case of the USPS, which can process up to 20 million parcels a day, could return 8 million or more weight measurements a day. There can be anywhere from 10,000 to 400,000 new scans on scales every 30 minutes on over 1,400 scales throughout the distribution network. The accuracy of scales can be used to evaluate whether a sender has provided adequate or correct postage or payment for the shipping of the item in the distribution network. With such a high volume, shortpaid packages, or packages for which insufficient postage was paid, based on an incorrect weight provided actual weights using scales whose accuracy is trusted. The processes described herein can be used to determine whether any scale in the distribution network is trusted or untrusted for any given time period.

A distribution network can include a plurality of scales. In some embodiments, the plurality of scales can be incorporated into processing equipment, such as mail or parcel processing equipment. Such scales can be inline scales as part of induction equipment, conveyor belt systems, and the like. In some embodiments, the scales can be associated with manual or semi-automated sorting processes, or can be scales at a retail facility such as a post office and the like. The processing equipment can be found in multiple area, regional, or local facilities within the distribution network. The processing equipment can be in communication with a system, which can include one or more processors, and one or more data repositories, data stores, and/or databases. Scan information can be obtained in the processing equipment and transmitted and stored in the data repositories. The scan information can be accessed, read, and manipulated by the one or more processors to carry out the processes and methods described herein.

An item inducted in to the distribution network can be weighed on 1, 2, 3, or more scales in different facilities as the item moves through the distribution network. The weight of a package as it is weighed on multiple scales in the distribution network can be used to determine how the individual scales are performing. For example, if a parcel is weighed on 4 scales as the parcel moves through the distribution network, the 4 measured weights from the 4 scales can be compared to each other to determine whether the 4 scales agree. Where one or more of the scales returns a weight inconsistent with one or more of the other scales, the scales can be determined to have a problem. By collecting the data for multiple items across many scales in the distribution network, the scales can be given trust or confidence scores.

In some embodiments, the processes, algorithms, and logic described with regard to scales can be applied to dimensioning devices.

In one method of assessing accuracy or quality of a first scale, the method includes weighing a first package on the first scale, weighing the first package on a plurality of other scales, and comparing the weight of the first package on the first scale with the weight of the first package on the plurality of other scales. The closer the agreement between the weight of the first package on the first scale with the weight of the first package on the plurality of other scales, the higher the quality rating of the first scale. In another method of rating quality of a plurality of scales, the method includes weighing a first package on a plurality of scales, assigning a first pass rate to each scale within the plurality of scales based upon general agreement of first package weight between each of the scales within the plurality of scales, weighing a second package on a plurality of scales, and assigning a second pass rate to each scale within the plurality of scales based upon both general agreement of second package weight between each of the scales within the plurality of scales and with each of the scales within the plurality of scales having a greater influence based upon a higher first pass rate. These methods and others variations are illustrated in part by the figures of the present application.

Scale accuracy, trustworthiness, and/or confidence can be assessed by evaluating scan data on a plurality of scales using a plurality of items, by comparing the consistency in weight of one package on a plurality of scales. By evaluating each scale's performance with a plurality of items, trust values can be assigned to scales which are determined to frequently agree with other scales within the distribution network on the weight of items.

Variance of scales in processing equipment can vary based on several factors, including environmental factors, calibration processes, scale drift, and/or other factors. In order to ensure weights and pricing accuracy, ensuring scales are accurate can be advantageous. A large shipper, such as a commercial retailer, may sell many items and may use a distribution network, such as the United States Postal Service (USPS) to deliver the items. The commercial shipper may pre-pay for the items to be delivered by the USPS. The shipper may provide payment along with an item weight in a manifest. However, the manifested weight of the item and the actual weight of the item may not correspond, due to a variety of reasons. To ensure that the correct amount is paid to ship the items, accurate and trusted scales can be advantageous. If the distribution network identifies that an item, or a threshold number of items have actual weights smaller than the manifested weights, the distribution network can receive additional payment in order to ensure the service is correctly paid for. To find the actual weights of items, it is desirable to have a high level of scale accuracy, or to identify which scales in a distribution network are accurate and trusted.

For a particular item and for a particular scale, the process of FIG. 1 can be used to determine whether a particular scan for an item is accurate or can be trusted. The item processing equipment can be in communication with a scale, as described herein. The item processing equipment can read an identifier on each item, can weigh each item, or can weigh only selected items based on a predetermined items or items with particular characteristics. The weight of each can be stored and associated with a unique identifier which is read from the item via the item processing equipment. The unique identifier can be a computer readable code located on the item, such as on a label attached to the item. The item processing equipment, including the scale, can be in communication with a database and a processor configured to receive the item information and the scan information from the scales in order to determine whether scans and/or scales are accurate and can be used to compare with a manifested weight, or can be used to calculate or determine pricing for shipping an item.

FIG. 1 is a workflow diagram illustrating a method of rating scale quality of a plurality of scales. In FIG. 1 a process 100 begins in step 102 with compiling all measurement weights or "scans" received at a central location from all scales within the plurality of scales. Scans outside of a particular time limit window. If a particular scan is not from an industrial scale then either a determination needs to be made about the accuracy of that scale or a determination is made as to whether the scan was feasible. The data from the database storing weighed values is ingested and readied in step 104. This step will be described in further detail with regard to FIG. 2.

The process 100 moves to step 106, wherein any late scans are identified. Late scans can be scans that fall outside of the particular time limit. This step will be described in further detail with regard to FIG. 3. Scans can be weight measurements of items, and generally correspond to a reading of a computer readable code or other code on an item, such that the weight measurement can be associated with each unique item for use or reference in subsequent scans.

The process 100 moves to decision state 108, wherein it is determined if the scan information comes from a manual scan-where-you-band scale. In some embodiments, this decision state can be used to exclude or include any particular type of scale, as required. For example, all scales in the distribution network can be included at this stage, and calibration data can be checked (as in decision state 110). This decision state will be described in greater detail with regard to FIG. 4. In some embodiments, where a scale requires a manual read or scan of a computer readable code on the item and a manual weighing process, this scan information may not be useful or necessary in the trusted scale logic described here. In some embodiments, the system may not wish to calculate a scale quality score or other parameters for a manual scale.

If the scan is from a manual scan-where-you-band (MSWYB) type scale (or any other desired type of scale), the process moves to decision state 110, wherein it is determined whether a calibration scan for the scale has been performed within the previous 24 hours. In some embodiments, a calibration scan can be defined as a scan of an item having the calibration scan information encoded within the unique identifier. For example, if the item has an IMpb-type (intelligent mail package barcode) barcode, the calibration scan can be identified if the 6$^{th}$ through 15$^{th}$ characters of the last 26 characters are "999977423", or any other desired number.

If no calibration scan for the selected scale has been performed in the previous 24 hours, the process 100 moves to process block 112, wherein a score of "0" is given to the scale. If a calibration scan for the scale does exist within the previous 24 hours, the process 100 moves to block 114, wherein it is determined whether the weight and dimensions of the item are within the predetermined range or accuracy for the item. In some embodiments, the weight of the calibration scan item can be 10 ounces. If the MSWYB scale returns a weight within a plus/minus 0.2 ounce tolerance of the 10 ounce calibration scan item weight, the scale receives a score of 1, otherwise, the scale receives a score of 0. In some embodiments, the range or accuracy for the scale can be plus or minus 2 ounces, or any other desired weight, of other scans of the same item on other scales. If the prior scan weights and the weight reported by the scale, then the weight is determined to be within range. In some embodiments, the scan weight can be compared to the manifested weight.

The MSWYB scale can return dimensions of an item as well. A calibration item may have a known length, width, and height. In some embodiments, the calibration item may be 14" long, 12" wide, and 3" tall. If the detected dimensions are within plus/minus 0.25" for each dimension, the dimension score can be set at 1, otherwise, the score can be set at 0.

The process 100 moves to step 116, wherein the dimensions and weight score are recorded, and assigned to the table in the scan service.

Returning to decision state 108, if the scan is not from a scan-where-you-band scale, or other type of scale, the process 100 moves to step 118, wherein an initial pass or fail is assigned to the scan. In some embodiments, the process 100 can move to step 118 for each scale in a distribution network. An initial pass or fail can be assigned to the scan based on prior scans of the same item on other item processing equipment. For each scan or weight measurement taken, the system determines if the other scans (if any) of the same item had a weight within a tolerance of the current scan weight. In some embodiments, the tolerance is plus/minus 2 ounces. The tolerance can be set at any desired tolerance. If the current scan is within the tolerance of other scans of the same item, the current scan is given a "pass". If the other scans of the do not have a weight within the tolerance, the scan is given a "fail" or "warning." In some embodiments, the prior scans of the same item can be limited by one or more parameters. For example, the system may evaluate scans of the same item, or scans which are associated with a particular unique identifier, which occur within the previous 10 days. A time restriction can filter out scans of prior items which have a re-used identifier. In some embodiments, the parameter can be a particular type of scale, a geographic region, and the like.

The process 100 moves to step 120, wherein an initial pass rate for the scale is calculated. For the given scale, item processing equipment including the scale, and/or each induction equipment, or combination thereof, the system calculates the total number of scans performed by the scale for a given time period, and a percentage of those scans which received a "pass." The initial pass rate for the scale is the number of scans which received an initial "pass" divided by the total number of scans performed within a given time period. In some embodiments, the given time period can be 30 minutes, or any other desired time period. Using 30 minutes of scan data for the scale can be advantageous, as it can provide a sufficient number of scans to have a minimum sample size for making reliable and accurate calculations, but will not have so many scans that the processing time is excessive, or the dataset becomes unmanageable.

The process 100 moves to block 122, wherein the "Updated Votes" is calculated. The system determines whether the current scale, item processing equipment including the scale, and/or each induction equipment or combination thereof has at least a threshold number of scans for a given time period, such as an hour, a day, two days, or any other desired time period. In some embodiments, the threshold number of measurements can be 5. The threshold number can be set at any desired number or level. If the scale, processing equipment, and/or inductor, or combination thereof, does not have a threshold number of scans, the scale, processing equipment and/or induction, or combination thereof receives an "updated votes" value equal to 1. A value of 1 can be an equivalent of a neutral scale, or a scale where the information is insufficient to make a determination. The "updated votes" value can be referred to as a scale weighting factor.

If the scale, processing equipment, and/or inductor, or combination thereof, does have a threshold number of scans, such as more than 5, the scale, processing equipment and/or induction, or combination thereof, the system recalculates the percentage of scans which have received a "pass," and sets the "updated votes" value or scale weighting factor equal to the percent of scans which received a "pass". The scale weighting factor for the scale can be normalized between 0.01 and 1.99, or any other desired scale or range. The system then records the "updated votes" value for the scale, item processing equipment, etc. on which the current scan and weight measurement were taken. The "updated votes" value is stored and associated with the item and the current weight measurement.

The process 100 moves to step 124, wherein each scan is given a final pass or fail. For each scan, the processor determines the sum of "updated votes" for other scans of the same piece that fall within the threshold of the current scan weight, e.g., 2 oz. The system then calculates whether the sum of the calculated scale weighting factor, divided by the sum of scale weighting factors for all other scans of the same piece, regardless of whether they are within the threshold. If this value is greater than 50% (or other desired value), the scan is given a "pass". If the value is greater than 50%, the scan is given a final "pass" value. If not, the scan is given a "warning" or "fail" value.

The process 100 moves to decision state 126, wherein it is determined whether the scan received a final pass. If not, the process 100 moves to step 128, wherein the scan data is shown in the exception table.

If the scan received a final pass, the process 100 moves to step 130, wherein the scan quality score is calculated. A scan quality score can be calculated for a scale based on the sample size, or the number of informative or useable scans within a given time period. The scans quality score for a scale with 20 or more scans can be calculated according to Table 1 below:

TABLE 1

| Function Name | Function Significance | Function | Variables |
|---|---|---|---|
| SCV_A | Scan confidence value for $s > 20$ | $p * (100/(1 + 100*e^{(-0.5s)}))/100$ | p = pass rate<br>s = sample size |

For scales with 11 to 19 scans, the scan quality score can be calculated according to Table 2 below:

TABLE 2

| Function Name | Function Significance | Function | Variables |
|---|---|---|---|
| SCV_A | Scan confidence value for $11 < s < 19$ | $p * (100/(1 + 100*e^{(-0.5s)}))/100$ | p = pass rate<br>s = sample size |
| F_A1 | Linear combination function to calculate p when all time periods have $s >= 10$ | $f(x) = (11x + 3y + z)/15$ | x = pass rate<br>y = score at t-1<br>z = score at t-2 |
| F_A2 | Linear combination function to calculate p when t and t-1 have | $f(x) = (12x + 3y)/15$ | x = pass rate<br>y = score at t-1 |

TABLE 2-continued

| Function Name | Function Significance | Function | Variables |
|---|---|---|---|
| | $s >= 10$ | | |
| F_A3 | Linear combination function to calculate p when t and t-2 have $s >= 10$ | $f(x) = (14x + y)/15$ | x = pass rate<br>y = score at t-2 |
| F_A4 | When t, t-1, and t-2 have $s < 10$ | 0 | |

"t-1" and "t-2" can be the scale quality scores or scan quality scores for the scale calculated in previous intervals. For example, where the interval is 30 minutes, t-1 can correspond to the score for the prior 30 minute period, and t-2 can correspond to the 30 minute period prior to t-1.

For scales with 6 to 10 scans, the scan quality score can be calculated according to Table 3 below:

TABLE 3

| Function Name | Function Significance | Function | Variables |
|---|---|---|---|
| SCV_B | Scan confidence value for $6 < s < 10$ | $p * (100/(1 + 100*e^{(-s)}))/100$ | p = pass rate<br>s = sample size |
| F_B1 | Linear combination function to calculate p when all time periods have $s >= 20$ | $f(x) = (6x + 5y + 4z)/15$ | x = pass rate<br>y = score at t-1<br>z = score at t-2 |
| F_B2 | Linear combination function to calculate p when t and t-1 have $s >= 20$ | $f(x) = (10x + 5y)/15$ | x = pass rate<br>y = score at t-1 |
| F_B3 | Linear combination function to calculate p when t and t-2 have $s >= 20$ | $f(x) = (11x + 4y)/15$ | x = pass rate<br>y = score at t-2 |
| F_B4 | When t, t-1, and t-2 have $s < 20$ | 0 | |

For scales with 2 to 5 scans, the scan quality score can be calculated according to Table 4 below:

TABLE 4

| Function Name | Function Significance | Function | Variables |
|---|---|---|---|
| SVC_C | Scan confidence value for $2 < s < 5$ | $p * (100/(1 + 100*e^{(-0.35s)}))/100$ | p = pass rate<br>s = sample size |
| F_C1 | Linear combination function to calculate p when all time periods have $s >= 20$ | $(6x + 5y + 4z)/15$ | x = pass rate<br>y = score at t-1<br>z = SCV at t-2 |
| F_C2 | Linear combination function to calculate p when t and t-1 have $s >= 20$ | $(5x + 10y)/15$ | x = pass rate<br>y = score at t-1 |
| F_C3 | Linear combination function to calculate p when t and t-2 have $s >= 20$ | $(6x + 9y)/15$ | x = pass rate<br>y = score at t-2 |
| F_C4 | When t, t-1, and t-2 have $s < 20$ | 0 | |

In Tables 1-4, the number of scans can be a configurable value. A person of skill in the art would understand, guided by this disclosure, that the number of scans, e.g., 11-19, could be altered.

The process 100 proceeds to step 132, wherein the scale quality score is calculated. For a scale with 20 or more scans, the scale quality score can be calculated as a weighted linear function of pass rate, total informative scans, and total scans if the scale has greater than or equal to 20 informative scans. It should include the same information from t−1 and t−2 as a function of time. In some embodiments, the scale quality score can be determined by equation (1):

$$\text{SCORE} = P*(SCV\_A) \quad (1)$$

For scales with 11 to 19 scans, the scale quality score can calculated as a weighted linear function of pass rate, total informative scans, and total scans if the scale has between 11 and 19 (inclusive) informative scans. It should include the same information from t−1 and t−2 as a function of time, and can be conditional upon sample size in previous time periods. In some embodiments, the scale quality score can be determined by equations (2a)-(2d):

$$\text{SCORE} = F\_A1(P, SCV\_AT\text{-}1, SCV\_AT\text{-}2) \quad (2A)$$

$$\text{SCORE} = F\_A2(P, SCV\_AT\text{-}1) \quad (2B)$$

$$\text{SCORE} = F\_A3(P, SCV\_AT\text{-}2) \quad (2C)$$

$$\text{SCORE} = F\_A4 \quad (2D)$$

For scales with 6 to 10 scans, the scale quality score can calculated as a weighted linear function of pass rate, total informative scans, and total scans if the scale has between 6 and 10 (inclusive) informative scans. It should include the same information from t−1 and t−2 as a function of time. In some embodiments, the scale quality score can be determined by equations (3a)-(3d):

$$\text{SCORE} = F\_B1(P, SCV\ BT\text{-}1, SCV\_BT\text{-}2) \quad (3A)$$

$$\text{SCORE} = F\_B2(P, SCV\_BT\text{-}1) \quad (3B)$$

$$\text{SCORE} = F\_B3(P, SCV\_BT\text{-}2) \quad (3C)$$

$$\text{SCORE} = F\_B4 \quad (3D)$$

For scales with 2 to 5 scans, the scale quality score can calculated as a weighted linear function of pass rate, total informative scans, and total scans if the scale has between 2 and 5 (inclusive) informative scans. It should include the same information from t−1 and t−2 as a function of time. In some embodiments, the scale quality score can be determined by equations (3a)-(3d):

$$\text{SCORE} = F\_C1(P, SCV\_CT\text{-}1, SCV\_CT\text{-}2) \quad (3A)$$

$$\text{SCORE} = F\_C2(P, SCV\_CT\text{-}1) \quad (3B)$$

$$\text{SCORE} = F\_C3(P, SCV\_CT\text{-}2) \quad (3C)$$

$$\text{SCORE} = F\_C4 \quad (3D)$$

If the scale has a scale quality score of 0, then the processor adjusts the scale quality score to the scan confidence value for the current period, if the scale has 95% or greater elevated scans. If the scale does not have 95% or greater elevated scans, then the scale receives a score of 0. The 95% value can be configured as desired.

The process 100 moves to step 134, wherein a final pass rate or score is calculated for each scale. The final pass rate is determined by dividing the sum of final passed scans by the total scans evaluated for the time period. In some embodiments, the final pass rate or score can be set to the scale quality score.

The process 100 moves to step 136, wherein the weight score for the scale is calculated. The weight score for the scale can be calculated by using the scale quality score to determine a threshold or an accuracy value for the scale. The process 100 moves to step 138, wherein this value is stored. In some embodiments, the weight score can be the same as the scale quality score, or can be the same as the final pass rate for each scale.

Returning again to decision state 108, if the scan is not from an MSWYB scale, the system can proceed down a parallel path to that described above. The process 100 moves to step 140, wherein it is determined whether dimensions taken from a scan are feasible or not. An item, such as a box or other known packaging material can have known dimensions. To illustrate, a box is purchased at a store or a postal facility, or online, etc. The box has a UPC thereon. The system stores the UPC for the box in a database, together with known dimensions for the box, for example, where the box is of a known size. When the item is scanned, the item processing equipment can scan the UPC and determine the size of the box based on the known dimensions of that type of box.

If any one dimension, or combination of dimensions, such as width, length, height, etc., is beyond or outside of a known dimension+/−a tolerance value, the system can identify the scan as "not feasible" since the dimension exceeds a known dimension for the item. If the dimensions do not exceed the known dimension+/−a tolerance value, the scan can be determined as "feasible."

The process 100 moves to step 142, wherein a Scale dimension feasibility rate for each scale dimensioner is calculated. This rate can be identified by finding the number of feasible scans divided by the total number of scans.

The process 100 moves to step 144, wherein the dimension score for the scale is calculated. If the scale/dimensioner has more than a threshold number or scans in the time interval being calculated, the dimensioner score is equal to the feasibility rate calculated in step 142. If there are fewer than a threshold number of scans, then the dimensioner score is set to 0. The process 100 moves to step 146, wherein the threshold number of scans is stored.

For each scale, item processing equipment, and/or inductor equipment, or combination thereof, the system determines whether a scale is "trusted". The system calculates the percentage of scans given a value of "pass" on the day being evaluated. If a given scale, item processing equipment, and/or inductor equipment, or combination thereof, has a "pass" percentage greater than a threshold percentage, the scale, item processing equipment, and/or inductor equipment, or combination thereof is determined to be "trusted." If the "pass" percentage is less than the threshold, the scale, item processing equipment, and/or inductor equipment, or combination thereof is not determined to be "trusted." In some embodiments, the threshold value can be 95%. In some embodiments, the threshold value can be any desired value. If there are not at least a minimum number of scans for a scale, then the status does not change. In some embodiments, the minimum number of scans can be 20 scans. In some embodiments the minimum number of scans can be any desired value. In some embodiments, if the scale does not have at least 20 scans, the scale is not determined to be "trusted."

Figure 2:
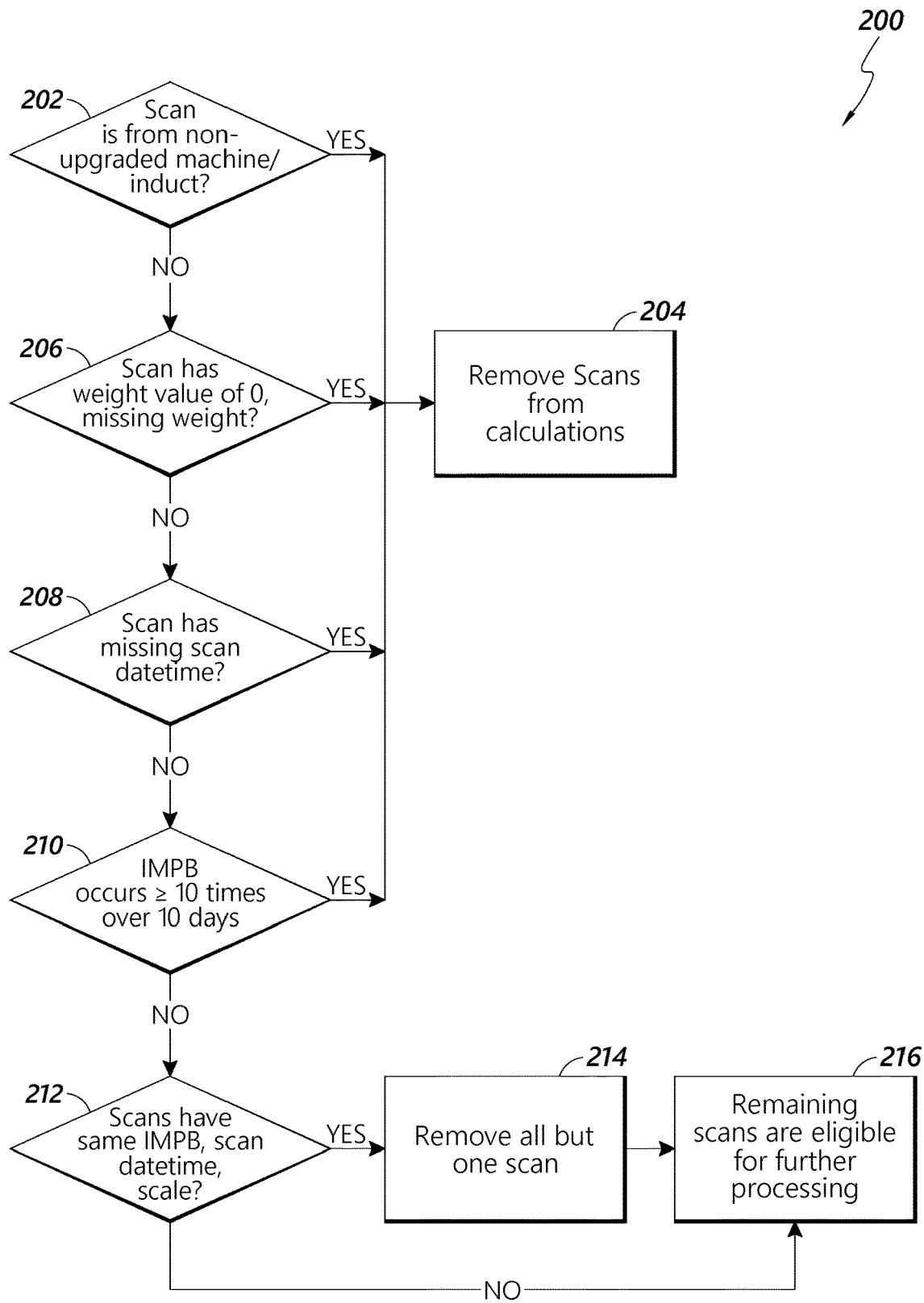
FIG. 2 is a flow diagram illustrating an exemplary method for ingesting scan data.

FIG. 2 illustrates an exemplary method for ingesting scan data, for example, as part of step 104 of process 100. A process 200 begins by obtaining all scan data for a plurality of scales for a given time period. The process can run every day, every weekday, every other day, or at any desired periodicity. The scan data for the plurality of scales is obtained for the previous 5 days, or for any other desired time period. This data includes an identifier for the item, such as a computer readable code, package barcode, IMpb, etc.; the detected weight, a machine ID, a machine type, an induction point, and a scan date.

In decision state 202, it is determined whether a particular scan is from a non-upgraded machine or induction point. If the machine or induction point is not upgraded, or, in other words, is known to have inferior scales, error prone scales, manual scales, etc., the process moves to step 204, wherein the scan data is removed and is not used in the calculations.

If the scan data is not from a non-upgraded machine or induction point, the process moves to decision state 206, wherein it is determined whether the scan has a weight value of 0, or the weight value is missing. If a scan record is missing a weight value, or has a weight value of 0, then the process moves to step 204, wherein the scan data is removed and is not used in the calculations.

If the scan data has a non-zero value, the process 100 moves to decision state 208, wherein it is determined whether the scan data is missing a date/time. If a scan record is missing a date/time, the process moves to step 204, wherein the scan data is removed and is not used in the calculations.

If the scan data has a date/time, the process 100 moves to decision state 210, wherein it is determined whether the unique identifier occurs 10 or more times over 10 days. If the unique identifier occurs 10 or more times over 10 days, it is assumed that the item is un-addressable, stuck in the processing facility or in a loop, or is a calibration or other special item. The process 100 then moves to step 204, wherein the scan data for that identifier is removed and is not used in the calculations. It is understood that 10 times and 10 days are exemplary only, and that other values could be used without departing from the scope of this disclosure.

If the unique identifier does not have 10 or more scans over the previous 10 days, the process 100 moves to decision state 212, wherein it is determined whether the scan data is duplicative, such as having the same unique identifier scanned on the same scale or at the same time on the same day. If a scan record is duplicative, the process moves to step 214, wherein only 1 of the duplicative scan records is used.

The process 200 moves to step 216, wherein the remaining scans are determined eligible for further processing as described elsewhere herein.

Figure 3:
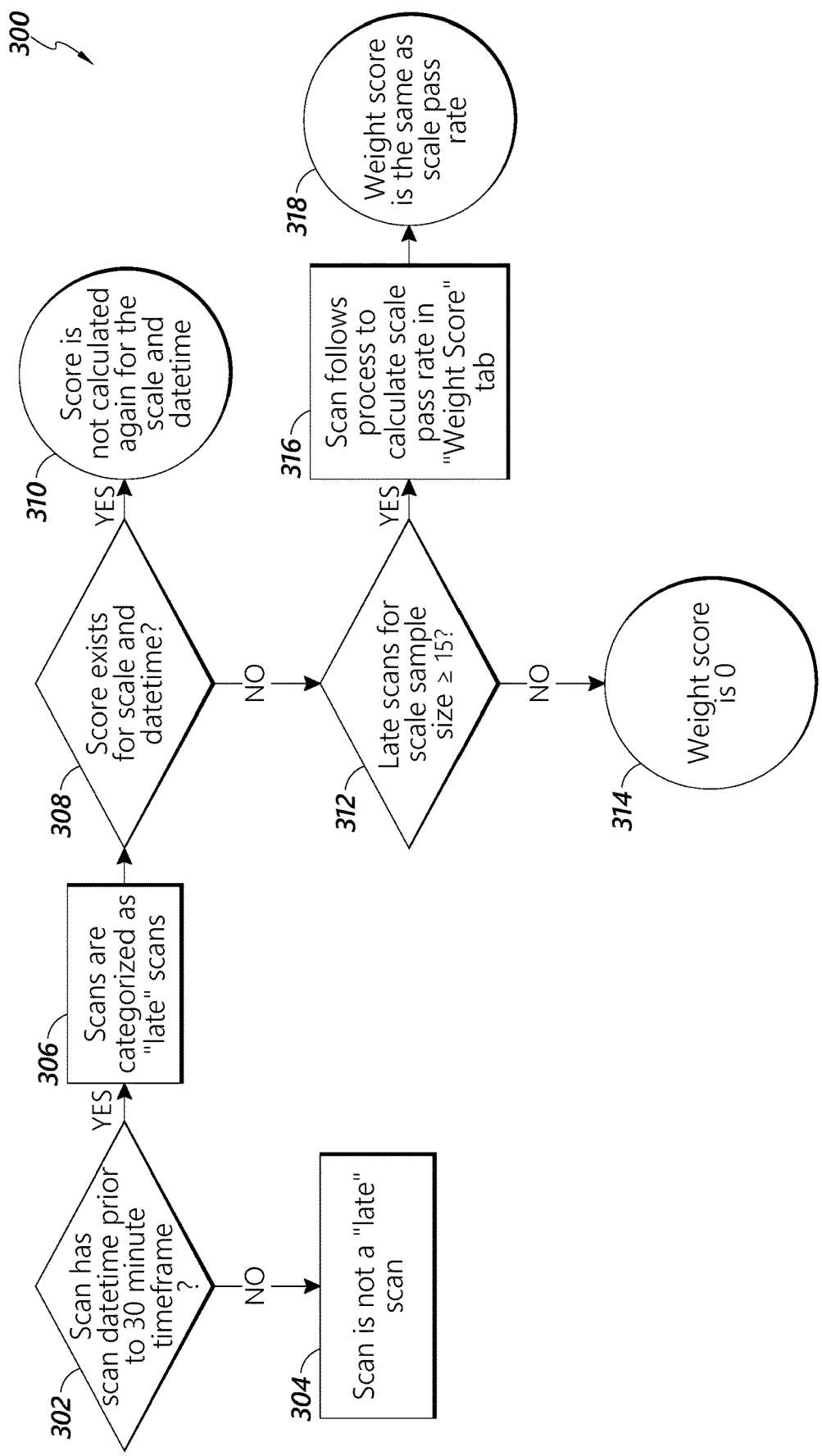
FIG. 3 is a flow diagram illustrating an exemplary method for addressing late scan data.

FIG. 3 illustrates an exemplary process for identifying late scans according to step 106 of process 100. A process 300 begins at decision state 302, wherein it is determined whether a scan has a date/time stamp prior to a set time frame, such as a 30 minute timeframe. As described above, scales may be evaluated based on a specified interval. The interval can be 30 minutes, or any other desired. If a scan record in the scan data has a date/time which is within the 30 minute time frame, the process 300 moves to step 302, wherein the scan is not considered a "late" scan.

If the scan record has a date/time which is prior to the 30 minute time frame, the process 300 moves to step 304, wherein the scan is categorized as a "late" scan. The process 300 moves to decision state 308, wherein it is determined whether a score exists for the scale and for the interval of interest. If a score does exist, the process 300 moves to step 310 and a score is not calculated for the scale for that time period.

If a score does not exist for a scale having a late scan for the time period under consideration, the process 300 moves to decision state 312, wherein it is determined if there are a number of late scans exceeding a set threshold. In some embodiments, the set threshold can be 15 scans. If the number of scans does not exceed the set threshold, the process 300 moves to step 314, wherein the weight score is 0. If the number of scans meets or exceeds the set threshold, the process 300 moves to step 316, wherein the scale pass rate is calculated as described elsewhere herein. The process 300 ends in step 318, wherein the scale pass rate is set the same as the weight score.

Figure 4:
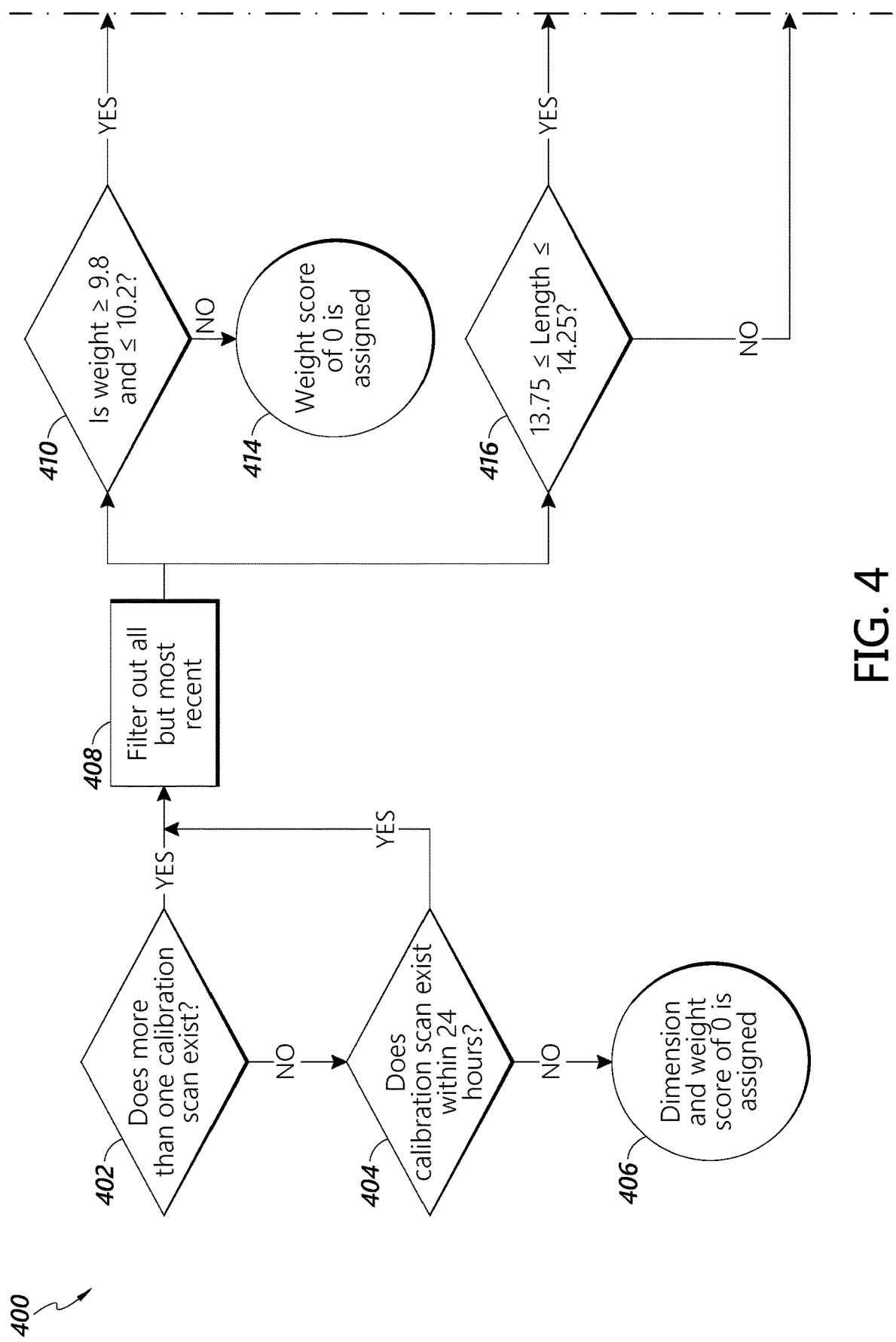
FIG. 4 is a flow diagram illustrating an exemplary method of improving accuracy of a scale rating by accounting for recent calibration.
Figure 4:
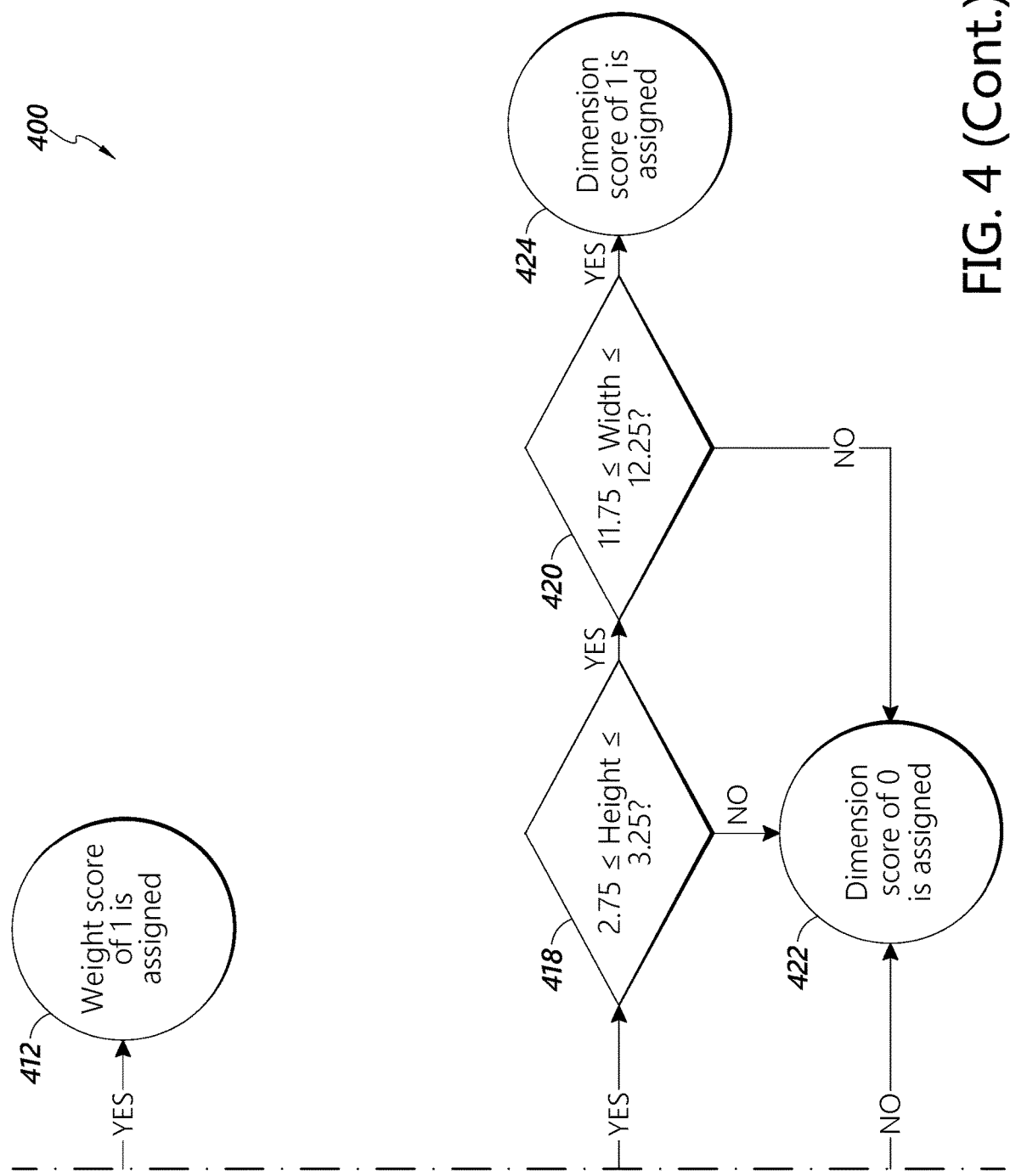

FIG. 4 is flow chart depicting an embodiment of a process for using scans from MSWYB scales and logic calculations, as described in decision states 108 and 110 of process 100. A process 400 begins in decision state 402, wherein it is determined whether there is more than one calibration scan in the data for the MSWYB scale. If there is not more than one calibration scan, the process 400 moves to decision state 404, wherein it is determined whether the prior calibration scan is within the prior 24 hours. If the scan is not within 24 hours, the process 400 moves to step 406, wherein the dimension and weight score of 0 are assigned. If there is a calibration scan within the previous 24 hours, the process moves to step 408, wherein all but the most recent calibration scan data is filtered out.

The process 400 moves to decision state 410, wherein it is determined whether the calibration scan is within a threshold band of the calibration item weight. As noted above, the calibration item weight can be 10 ounces. If, in decision state 410, the scan shows the weight to be within +/−0.2 ounces of the calibration weight of 10 oz., the process 400 moves to step 412, and the weight score is set to 1. If the scan shows the weight is not within the tolerance of the calibration weight, the process 400 moves to step 414, and the weight score is set to 0.

In parallel or series with the weight determination in decision state 410, the process 400 determines whether the dimensions of the calibration item are within a threshold of the known measurements, as described in step 114 of process 100 above. If the dimensions determined in decision states 416, 418, and 420 are outside the threshold or tolerance, the process 400 moves to step 422, wherein the dimension score is set to 0. If the dimensions determined in decision states 416, 418, and 420 are within the threshold or tolerance, the process 400 moves to step 424, wherein the dimension score is set to 1.

Figure 5:
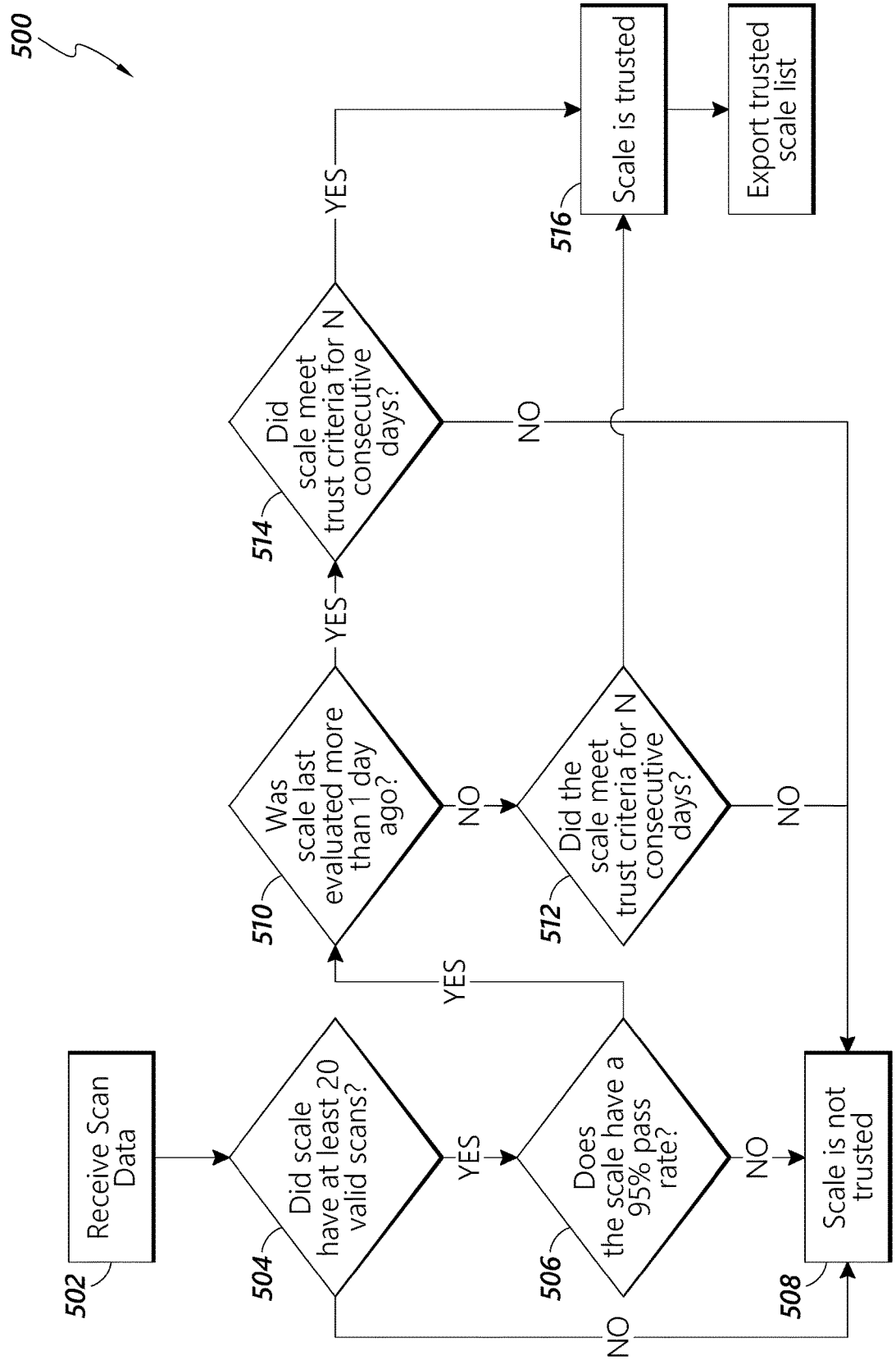
FIG. 5 is a flow chart depicting an embodiment of scale validation.

FIG. 5 is a flow chart depicting an embodiment of scale validation. A process 500 begins in step 502, wherein scan data is received. The scan data can be received as described elsewhere herein. The scan data can be used to determine which scales are trusted for a particular interval of time. This information can be used by the system to determine which packages require additional payment due to being heavier than the manifested and paid-for weight.

The process 500 moves to decision state 504, wherein it is determined whether a scale had at least 20 valid scans in the given time period. A valid scan can be a scan that includes all the required information, including weight, unique identifier, date/time, etc. If the scale did not have at least 20 valid scans in the time period, the scale is not determined to be "trusted" in step 508.

If the scale did have at least 20 valid scans, the process 500 moves to decision state 506, wherein it is determined whether the scale has a pass rate of 95% or greater, or a quality scale quality score of 0.95 or greater. These thresholds are exemplary only, and are not intended to be limiting. The pass rate for the scale can be determined by taking the total number of scans which were determined as final "pass", similar to the process described with regard to FIG. 1, and as shown in the Example 1 below, and dividing by the total number of scans for that scale. If the scale does not have at least a 95% pass rate, or a score of 0.95 or greater, the process 500 moves to step 508, and the scale is determined not to be "trusted." If the scale does has at least a 95% pass rate, or a score of 0.95 or greater, the process 500 moves to decision state 510, wherein it is determined whether the scale had been last evaluated more than 1 day ago. In some embodiments, it can be determined whether the scale was evaluated more than 1 business day, allowing for a gap on weekend days.

If the scale was evaluated more than a day ago, the process 500 moves to decision state 512, wherein it is determined whether the scale met trust criteria, that is, at least 20 valid scans and a pass rate of at least 95% (or other criteria as desired), for N consecutive days, where N can be 1, 2, 3, or any number of days. In some embodiments, the trust criteria can be limited to determining whether the scale quality score is 0.95 or greater, using the number of scans per scale as described elsewhere herein. If the scale did not meet the trust criteria for more than N consecutive days, the process 500 moves to step 508, and the scale is determined not to be trusted. If the scale did meet the trust criteria for N consecutive days, the process 500 moves to step 516, wherein it is determined that the scale is trusted.

If the scale was last evaluated more than 1 day ago, the process 500 moves to decision state 514, wherein it is determined whether the scale met the trust criteria for N consecutive days. If the scale did not meet the trust criteria, the scale is determined not to be trusted in step 508. If the scale did meet the trust criteria for N consecutive days, the process 500 moves to step 516, wherein it is determined that the scale is trusted.

The process 500 moves to step 518, wherein the list of trusted scales is recorded and exported for use in identifying underpaid or short paid items or packages.

The process 500, and/or other exemplary processes described herein can be performed for each scale every day, for each scale every 30 minutes or other time period. In some embodiments, the processes can be performed for groups of scales or batches on specific days, or at specific intervals, in order to increase or maximize processing efficiency.

Example 1

The following Table 5 provides an example of how individual packages are evaluated. Assume the scale pass rates were calculated on several additional packages not included in the example, and according to the processes and systems described elsewhere herein. Notice that final check utilizes the first scale pass rate to help determine the true weight of a piece.

TABLE 5

| Scan | Package | Scale ID | Weight (oz) | Initial Check | First Scale Pass Rate | Voting 'Influence' | Final Check | Final Pass Rate |
|---|---|---|---|---|---|---|---|---|
| 1 | A | SPBSTS-48239-001 | 13 | Pass | 82% | 1.25 | Pass | 96% |
| 2 | A | SPSS-43002-002 | 11 | Fail | 80% | 1.20 | Pass | 98% |
| 3 | A | SPBSTS-22203-005 | 48 | Fail | 15% | 0.04 | Fail | 15% |
| 4 | A | SPBSTS-27518-004 | 14 | Fail | 75% | 1.09 | Pass | 72% |
| 5 | B | SPBSTS-64002-001 | 14 | Fail | 60% | 0.72 | Fail | 40% |
| 6 | B | APPS-23429-005 | 17 | Fail | 78% | 1.12 | Fail | 80% |
| 7 | B | SPBSTS-22203-005 | 7 | Fail | 15% | 0.04 | Fail | 15% |
| 8 | B | SPBSTS-18765-004 | 32 | Fail | 45% | 0.44 | Fail | 40% |
| 9 | C | APPS-10023-005 | 50 | Pass | 90% | 1.74 | Pass | 98% |
| 10 | C | SPBSTS-02151-003 | 51 | Pass | 100% | 2.00 | Pass | 100% |
| 11 | D | SPSS-29811-002 | 64 | Fail | 95% | 1.81 | Pass | 98% |
| 12 | D | SPSS-35001-001 | 65 | Fail | 96% | 1.84 | Pass | 99% |
| 13 | D | SPBSTS-75524-002 | 32 | Fail | 28% | 0.16 | Fail | 20% |
| 14 | D | APPS-85098-004 | 112 | Fail | 60% | 0.72 | Fail | 65% |
| 15 | D | SPBSTS-90010-003 | 144 | Fail | 65% | 0.85 | Fail | 67% |

Table 5 shows the scan data for 4 separate packages, A-D. The scale ID corresponds to a particular scale, type of scale, in a particular facility. Each scale in the distribution network has a unique identifier. The letter portion of the identifier (e.g. SPBSTS, SPSS, APPS) corresponds to the type of scale and/or item processing equipment in which the scale is located. The numerical portion acts as a serial number identifying each scale.

As can be seen for package A, package A passed over 4 scales, generating 4 scans. The weight of package A was determined to be 13, 11, 48, and 14 ounces, respectively. Only scan 1 of package A passed the initial check, as described above with regard to FIG. 1. As shown, for scan 1, 2 of the 3 other scans of Package A (>50%) were within the 2 oz. tolerance, so the initial check is a "Pass." For scan 2, only scan 1 was within the 2 oz. tolerance, so, with only 1 of 3 other scans of Package A (<50%), the initial check for scan 2 is a "Fail." The same is true for Scan 3 and 4.

The first scale pass rate and voting "influence" ("updated votes") for the 4 scales which weighed item A were calculated using other package scans in a manner similar to that described with regard to FIG. 1. Scan 2 is determined to be a pass in the final check, because the sum of all the scans within 2 oz. of scan 2 weight divided by all other scans of package A is greater than 50%. That is, 1.25/(1.25+0.04+1.09)=53%. Therefore scan A is determined to have a final "Pass." The same is true for scan 4, but not for scan 3, so scan 3 has a final scan "Fail." The final scale pass rates are calculated as described elsewhere herein, by using the number of Final Checks marked as a 'Pass', divided by the total number of scans, on a given machine. If the final scale pass rate is greater than or equal to a threshold value, the scale can be determined to be a "trusted scale." In some embodiments, the threshold value can be 95%. When Example 2

The logic outputs the following metrics for each scale (a scale is defined by a unique combination of Machine ID, Facility ID, Induct, and Machine Type.) Based on the number of valid scans on the last day for a scale, and its pass rate, it receives an appropriate trust status. These concepts are illustrated in Tables 6 and 7.

TABLE 6

| Scale ID (Mach ID + Facility ID + Induct) | Match Type | Passed Scans | Failed Scans | Pass % | Trust Status |
|---|---|---|---|---|---|
| 001 00962 1 | SPBSTS | 12 | 0 | 100 | Insufficient Sample Size |
| 001 00962 2 | SPBSTS | 301 | 5 | 98 | Pass |
| 001 07699 2 | SPBSTS | 436 | 10 | 98 | Pass |
| 001 90009 2 | SPSS | 155 | 113 | 58 | Fail |

Because Scale IDs 001 00962 2 and 001 07699 2 have sample sizes of 20 or more, and because the final pass rate is at least 95%, these scales are determined to be trusted. The other scales either have too few scans, or a pass rate <95%. Accordingly, these scales are not determined to be trusted. The status of each scale is then reported to the system and changed accordingly.

TABLE 7

| Scale ID | Time | Pass Rate | Sample Size | Previous Pass Rate | Previous Sample Size | Score | Status |
|---|---|---|---|---|---|---|---|
| A | 1:00 PM | 100% | 86 | 100% | 34 | 1.00 | Trusted |
| A | 1:30 PM | 99% | 90 | 100% | 86 | 0.99 | Trusted |
| A | 2:00 PM | 100% | 8 | 99% | 90 | 0.96 | Trusted |
| B | 1:00 PM | 50% | 6 | 95% | 20 | 0.58 | Untrusted |
| B | 1:30 PM | 90% | 10 | 50% | 6 | 0.85 | Untrusted |
| B | 2:00 PM | 100% | 30 | 90% | 10 | 0.98 | Trusted |
| C | 1:00 PM | 0 | 0 | 0% | 0 | 0.00 | Untrusted |
| C | 1:30 PM | 100% | 7 | 0% | 0 | 0.84 | Untrusted |
| C | 2:00 PM | 97% | 100 | 100% | 7 | 0.97 | Trusted |

Table 7 illustrates the trusted/untrusted stats for 3 scales at 3 different time intervals. As described above, the trusted/untrusted status of a scale can be determined every 30 minutes. Where the score scale, which can be calculated as described elsewhere herein, is at least 0.95, a scale is determined to be trusted.

The scale trust logic described herein also applies to DSD scales, which are a subset of particular industrial (MSWYB) scales (see process of FIG. 1, for example). DSD scales are processed separately from the SPBSTS, SPSS, and APPS scale logic described in the above sections of this document. The DSD logic outputs an indicator for Trusted Weight, Trusted Dimension, and an overall indicator of whether to use that scale for pricing. The overall indicator is based only on Trusted Dimension, as described elsewhere herein. A DSD scale could therefore be used for pricing if it has Trusted Dimension, even if it does not have Trusted Weight.

The trusted scales are used to identify package weights which are likely to be correct. These weights from trusted scales are compared to the weights on an electronic manifest, or to an amount paid for the package, or both, to make a final determination of which shortpaid packages should go forward for additional collection. A final validation checks that the weight used for assessment is trustworthy, based on other weights captured and each scales performance. The data store or database used for the first step, MPE Scale Validation, is re-used for this final validation. In this method, first, the system identifies the list of shortpaid packages with postage above threshold, filtered to only those packages identified as being shortpaid based on scale trust determined as described herein. Second, each shortpaid package is checked against the data set used for item processing equipment scale validation for any other scans in the previous 10 days. Third, if additional scans for the shortpaid packages are found, the scans are checked to see if the other weights are different than the captured weight used in the shortpaid calculation. Different is defined as the weight variance is outside the tolerance.

Further, if there are alternative captured weights coming from trusted scales that differ by more than tolerance, the shortpaid package will be flagged as potentially invalid and will be evaluated using a weight simulation. For example, if there are no alternative captured weights, the shortpaid package will not be flagged. The system will send packages that are not flagged to the vendor for collection.

If there is only one scan of a package on a trusted scale, and the package is shortpaid, the shortpaid package will be evaluated using a weight simulation. A weight simulation is used to confirm that the weight from the trusted scale is useable for collecting additional payment.

Figure 6:
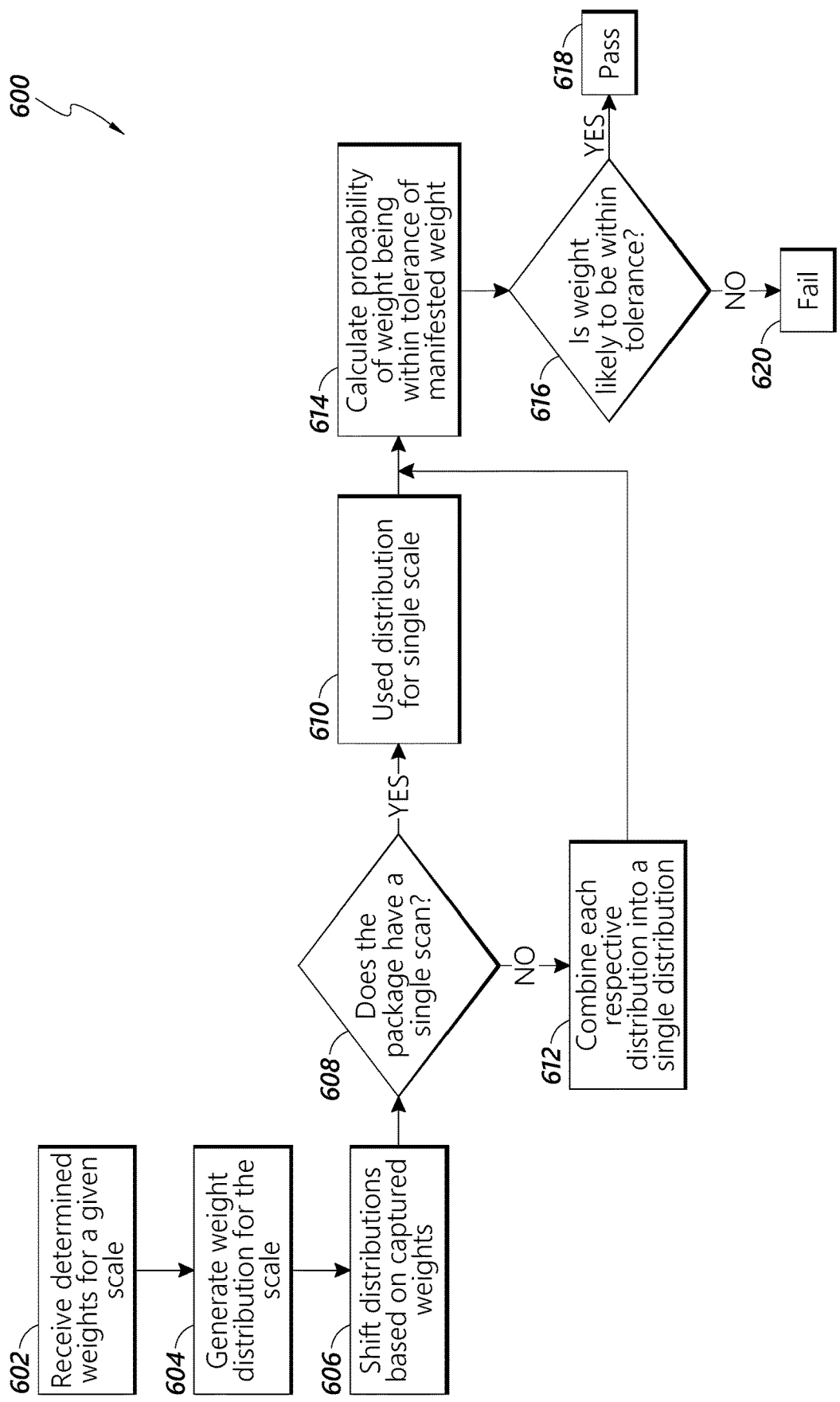
FIG. 6 is flow diagram illustrating an exemplary method for a weight simulation to use when a package has a small number of scans on item processing equipment.

FIG. 6 depicts a flow chart illustrating an embodiment of a method for weight simulation. A process 600 begins in step 602, wherein data for a scale on a unique day is collected for all the scans on that scale for a given time period. The process 600 moves to step 604, wherein the weight distribution for the scale is generated. The weight distribution is calculated by comparing the weight of a package from the scale to the weight recorded by a different trusted scale on the same package. Exemplary weight distributions for two scales can be seen in FIGS. 7A and 7B.

Figures 7A, 7B:
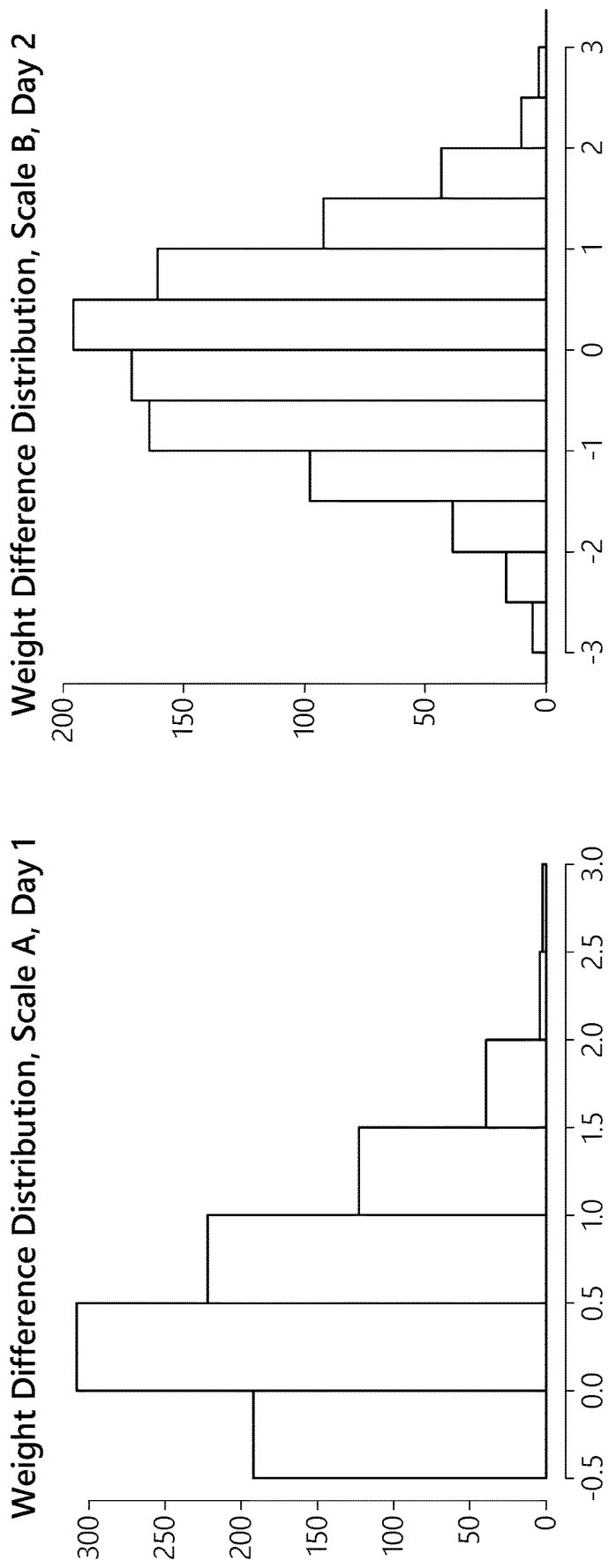
FIG. 7A depicts an exemplary weight distribution for a scales for a given day.
FIG. 7B depicts an exemplary weight distribution for a scales for a given day.

The process 600 moves to step 606, wherein the distribution for each scale is shifted based on the captured weight. FIGS. 7C and 7D depict the weight distributions for FIGS. 7A and 7B shifted based on the captured weight of the scales. The captured weight for Scale A on Day 1 is 20.00 ounces, and the captured weight for Scale B on Day 2 is 20.50 ounces.

Figure 7E:
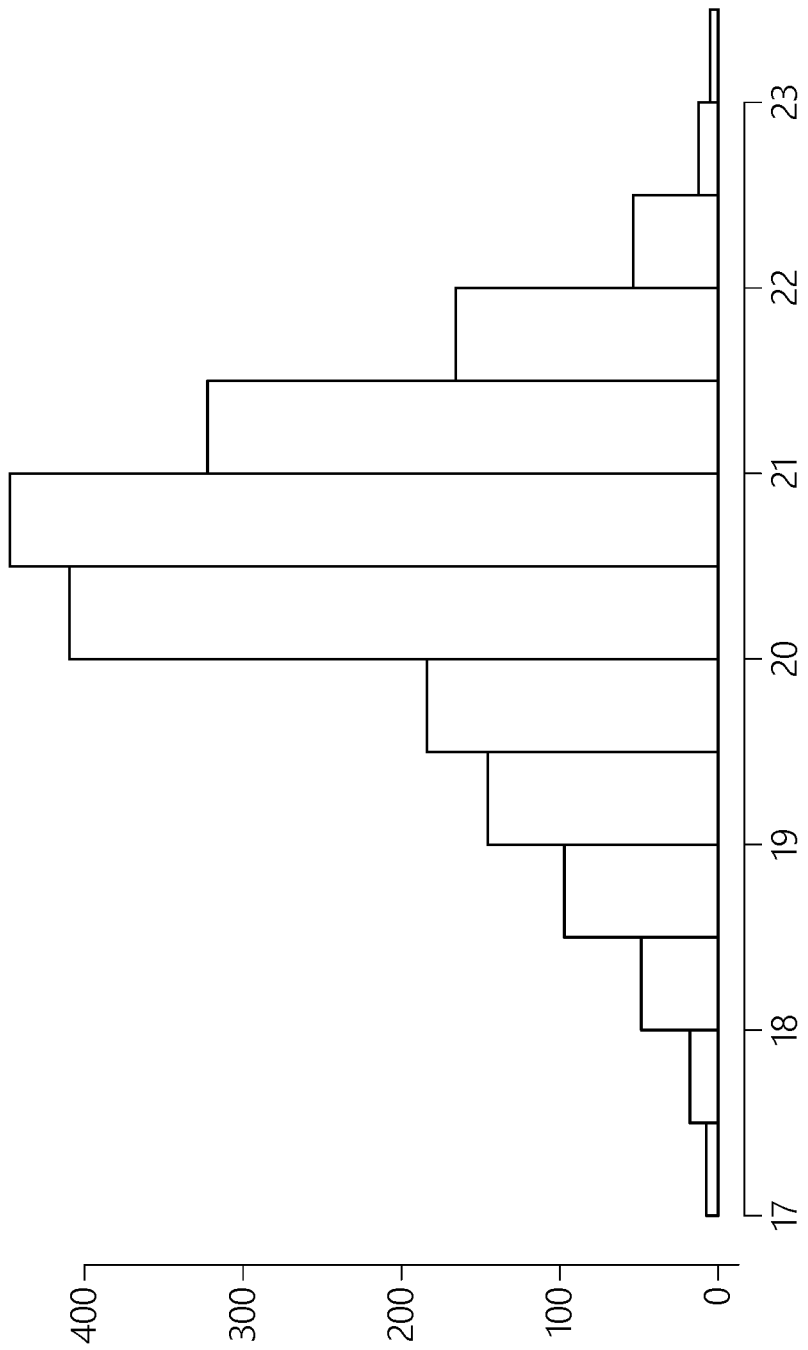
FIG. 7E depicts a combined distribution of simulated possible weights.

The process 600 moves to decision state 608, wherein it is determined if the package has a single scan. If the package has a single scan, then the distribution of weight differences for its scale for given day is used, in step 610. If the package does not have a single scan, but has more than one scan, the process 600 moves to step 612, wherein the distributions are combined into a single distribution. FIG. 7E depicts a combined distribution of simulated possible weights. A distribution coming from a scale with a high pass rate contributes significantly more to the combined distribution.

The process 600 moves to step 614, wherein the probability of the actual weight of a package being greater than the assessment weight (or manifested weight) minus the tolerance, e.g., 2 ounces. The distribution of possible weights is evaluated to determine whether a threshold value of possible simulated weights meets the tolerance criteria. For example, in some embodiments, the distribution of possible weights is evaluated, to determine whether 99% or more of the simulated weights are within 2 ounces of the manifested weight or assessment weight. In some embodiments, where there is only one scan, the threshold can be set at 99%. In some embodiments, where there is more than one scan, the threshold can be set at 98%. These thresholds are exemplary only, and are not intended to be limiting.

The process moves to decision state 616, wherein it is determined if the package weight is likely to meet the threshold criteria. If the threshold criteria is met, the process 600 moves to step 618, wherein the package passes post-verification, and no further assessment is needed. If the threshold criteria is not met, the process moves to step 620, wherein the package fails post-verification, and further assessment may be needed.

With any of the above-discussed methods, the daily output is captured and stored for audit purposes and analysis of trends. Further, the analytics program includes monitoring of output for quality and trends.

The disclosure is generally described herein using affirmative language to describe the numerous embodiments. The disclosure also includes embodiments in which subject matter is excluded, in full or in part, such as substances or materials, method steps and conditions, protocols, or procedures.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®. The system control may be written in any conventional programming language such as and ran under a conventional operating system. For example, any industry standard programming languages for which many commercial compilers can be used to create executable code may be used. The system control may also be written using interpreted languages.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present development.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A method of measuring an item, comprising:
weighing a first package on a first scale;
weighing the first package on a plurality of other scales;
storing, in a data store, a weight measurement of the first package on the first scale and a plurality of weight measurements of the first package on the plurality of other scales;
comparing the weight measurement of the first package on the first scale with the weight measurements of the first package on the plurality of other scales;
determining if a threshold number of the weight measurements of the first package on the plurality of other scales is within a weight tolerance of the weight measurement of the first package on the first scale;
storing, in the data store, a scale weighting factor associated with the first scale, the scale weighting factor determined based at least in part on whether the threshold number of the weight measurements of the first package on the plurality of other scales is within the weight tolerance of the weight measurement of the first package on the first scale;
selecting a subset of the individual scales of the plurality of other scales based at least in part on the weight measurements of the first package on the individual scales of the plurality of other scales, the subset comprising the individual scales of the plurality of other scales for which the weight measurement of the first package is within the weight tolerance of the weight measurement of the first package on the first scale; and
determining the first scale is a trusted scale based at least in part on a division result generated by:
summing a first set of scale weighting factors corresponding to individual scales of the plurality of other scales to obtain a total combined scale weighting factor;
summing a second set of scale weighting factors corresponding to the individual scales of the subset of the plurality of other scales for which the weight measurement of the first package is within the weight tolerance of the weight measurement of the first package on the first scale; and dividing the sum of the second set of scale weighting factors by the total combined scale weighting factor.

2. The method of claim 1, further comprising:

weighing a plurality of second packages on the first scale and on the plurality of other scales;

storing a plurality of weight measurements for the plurality of second packages on the first scale and on the plurality of other scales;

comparing the plurality of weight measurements of the plurality of second packages on the first scale with the weights of the plurality of second packages on the plurality of other scales; and determining if a threshold number of the weight measurements of the second packages on the plurality of other scales is within a weight tolerance of the weight measurements of the plurality of second packages on the first scale.

3. The method of claim 2, further comprising:

determining a total number of weight measurements for the first scale and for the plurality of other scales;

determining a percentage of weight measurements of the first package and the plurality of second packages on the first scale which are within the weight tolerances of the weight measurements for the first package and for the plurality of second packages; and determining whether the total number of weight measurements for the first scale has a minimum number of weight measurements.

4. The method of claim 3, further comprising:

if the total number of weight measurements for the first scale is less than the minimum number of weight measurements, setting the scale weighting factor to a neutral value; and if the total number of weight measurements for the first scale is greater than the minimum number of weight measurements, setting the scale weighting factor to correspond to the percentage of weight measurements of the first package and the plurality of second packages on the first scale which are within the weight tolerances of the weight measurements for the first package and for the plurality of second packages.

5. The method of claim 4 further comprising:

if the total number of weight measurements for each the plurality of other scales is less than the minimum number of weight measurements, setting the scale weighting factor for each of the plurality of other scales to a neutral value; and if the total number of weight measurements for each of the plurality of other scales are greater than the minimum number of weight measurements, setting the scale weighting factor for each of the plurality of other scales to correspond to the percentage of weight measurements of the first package and the plurality of second packages on the plurality of other scales which are within the weight tolerances of the weight measurements for the first package and for the plurality of second packages.

6. The method of claim 4, further comprising:

storing the division result of dividing the summed scale weighting factor and the total combined scale weighting factor.

7. The method of claim 1, further comprising determining the weight measurement of the first item on the first scale when the division result is greater than a scale weighting factor threshold.

8. The method of claim 7, further comprising categorizing the weight measurement of the first item on the first scale as a "pass" when the division result is greater than the scale weighting factor threshold.

9. The method of claim 8, further comprising determining, for the first scale, the number of weight measurements which are categorized as "pass" measurements in a given time period.

10. The method of claim 9, further comprising:

dividing the number of weight measurements categorized as a pass by the total number of weight measurements of the first item and the plurality of second items on the first scale to obtain a score for the first scale; and determining the first scale is a trusted scale when the score for the first scale is greater than a trust threshold.

11. The method of claim 10, wherein the trust threshold is set at 95%.

12. The method of claim 8, wherein the scale weighting factor threshold is set at 50%.

13. The method of claim 3, wherein the minimum number of weight measurements is 5.

14. The method of claim 2, wherein the threshold number of the weight measurements is 50%.

15. The method of claim 2, wherein the weight tolerance is plus/minus 0.2 ounces.

16. A system for measuring an item comprising:

a first scale to weigh a first package;

a plurality of other scales for weighing the first package;

a processor configured to receive a weight measurement for the first package from the first scale and a plurality of weight measurements for the first package from the plurality of other scales;

a data store configured to store the weight measurement of the first package on the first scale and the plurality of weight measurements of the first package on the plurality of other scales;

wherein the processor is further configured to:

compare the weight measurement of the first package on the first scale with the plurality of weight measurements of the first package on the plurality of other scales;

determine if a threshold number of the weight measurements of the first package on the plurality of other scales is within a weight tolerance of the weight measurement of the first package on the first scale;

store, in the data store, a scale weighting factor associated with the first scale;

select a subset of the individual scales of the plurality of other scales based at least in part on the weight measurements of the first package on the individual scales of the plurality of other scales, the subset comprising the individual scales of the plurality of other scales for which the weight measurement of the first package is within the weight tolerance of the weight measurement of the first package on the first scale; and determine the first scale is a trusted scale based at least in part on a division result generated by:

summing a first set of scale weighting factors corresponding to the plurality of other scales to obtain a total combined scale weighting factor;

summing a second set of scale weighting factors corresponding to the individual scales of the subset of the plurality of other scales for which the weight measurement of the first package is within the weight tolerance of the weight measurement of the first package on the first scale; and dividing the sum of the second set of scale weighting factors by the total combined scale weighting factor.

17. A method of measuring an item, comprising:

weighing a first package on a first scale;

weighing the first package on a plurality of other scales;

storing, in a data store, a weight measurement of the first package on the first scale and a plurality of weight measurements of the first package on the plurality of other scales;

comparing the weight measurement of the first package on the first scale with the weight measurements of the first package on the plurality of other scales;

determining if a threshold number of the weight measurements of the first package on the plurality of other scales is within a weight tolerance of the weight measurement of the first package on the first scale;

storing, in the data store, a scale weighting factor associated with the first scale, the scale weighting factor determined based at least in part on whether the threshold number of the weight measurements of the first package on the plurality of other scales is within the weight tolerance of the weight measurement of the first package on the first scale;

weighing a plurality of second packages on the first scale and on the plurality of other scales;

storing a plurality of weight measurements for the plurality of second packages on the first scale and on the plurality of other scales;

comparing the plurality of weight measurements of the plurality of second packages on the first scale with the weights of the plurality of second packages on the plurality of other scales;

determining if a threshold number of the weight measurements of the second packages on the plurality of other scales is within a weight tolerance of the weight measurements of the plurality of second packages on the first scale;

determining a total number of weight measurements for the first scale and for the plurality of other scales;

determining a percentage of weight measurements of the first package and the plurality of second packages on the first scale which are within the weight tolerances of the weight measurements for the first package and for the plurality of second packages;

determining whether the total number of weight measurements for the first scale has a minimum number of weight measurements;

if the total number of weight measurements for the first scale is less than the minimum number of weight measurements, setting the scale weighting factor to a neutral value;

if the total number of weight measurements for the first scale is greater than the minimum number of weight measurements, setting the scale weighting factor to correspond to the percentage of weight measurements of the first package and the plurality of second packages on the first scale which are within the weight tolerances of the weight measurements for the first package and for the plurality of second packages;

summing the scale weighting factor for each of the plurality of other scales which was determined to be within the weight tolerance of the weight measurement of the weight measurement for the second scale;

summing the scale weighting factor for each of the plurality of other scales regardless of whether the weight measurement was within the weight tolerance to obtain a total combined scale weighting factor;

dividing the summed scale weighting factor for each of the plurality of other scales which was determined to be within the weight tolerance of the weight measurement of the weight measurement for the second scale by the total combined scale weighting factor; and storing the division result of dividing the summed scale weighting factor and the total combined scale weighting factor.

* * * * *